(12) United States Patent
Ganachaud

(10) Patent No.: US 6,532,983 B2
(45) Date of Patent: *Mar. 18, 2003

(54) SYSTEM FOR VENTING A LIQUID TANK

(75) Inventor: Patrick Ganachaud, Laval (FR)

(73) Assignee: Inergy Automotive Systems Management, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/901,450

(22) Filed: Jul. 10, 2001

(65) Prior Publication Data

US 2002/0011265 A1 Jan. 31, 2002

(30) Foreign Application Priority Data

Jul. 13, 2000 (FR) .............................................. 00 09286

(51) Int. Cl.⁷ .............................................. F16K 17/36
(52) U.S. Cl. .............................. 137/43; 137/39; 137/264
(58) Field of Search ............................. 137/39, 43, 264

(56) References Cited

U.S. PATENT DOCUMENTS

| 4,886,089 A | * 12/1989 | Gabrlik et al. ............... 137/202 |
| 5,809,976 A | 9/1998 | Cook et al. |
| 5,971,002 A | 10/1999 | Turpin et al. |
| 6,230,732 B1 | * 5/2001 | Ganachaud et al. ........... 137/39 |
| 6,336,466 B1 | * 1/2002 | Ganachaud et al. ......... 137/202 |

FOREIGN PATENT DOCUMENTS

| EP | 0 921 026 A1 | 6/1999 |
| FR | 2 774 950 | 8/1999 |
| GB | 2 269 375 A | 2/1994 |

* cited by examiner

*Primary Examiner*—Stephen M. Hepperle
(74) *Attorney, Agent, or Firm*—Larson & Taylor PLC

(57) ABSTRACT

Combination of a float valve for venting a fuel tank allowing venting in the inclined position, preventing the ejection of liquid, fulfilling the OPD and ROV functions and the function of degassing during filling, and of a capacity equipped with a draining system capable of trapping small quantities of liquid fuel entrained with the gases and of returning them to the tank.

10 Claims, 1 Drawing Sheet

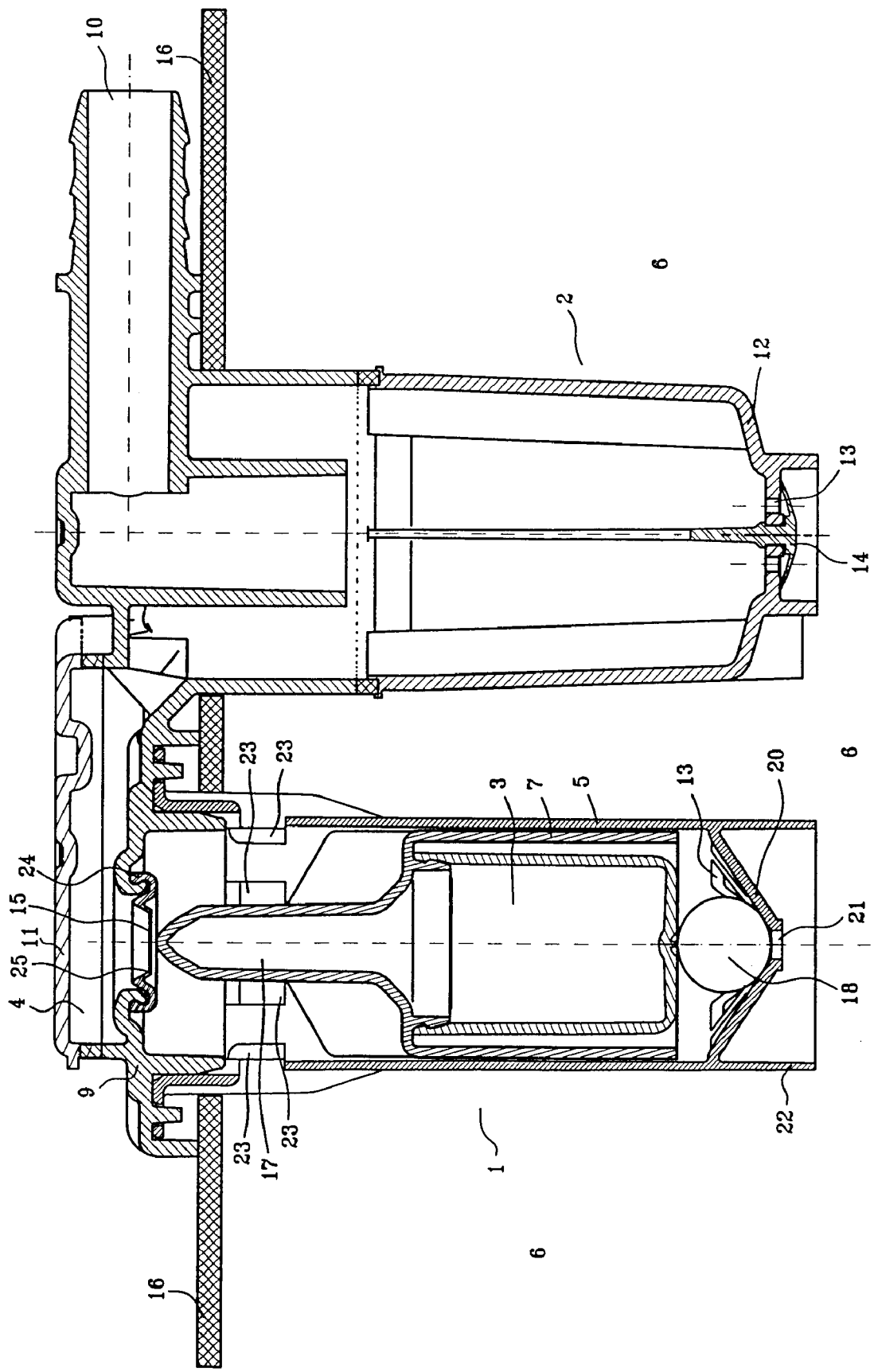

SYSTEM FOR VENTING A LIQUID TANK

The present invention relates to a system for venting a liquid tank.

Liquid tanks, when they are likely to be moved along with the liquid that they contain, are generally fitted with a venting system which guarantees safety with respect to the environment when the tank is subjected to various influences: movements in all directions and of any amplitude, thermal stress, depression and overpressure.

This requirement is encountered in the case of fuel tanks, particularly when mounted on motor vehicles and when it is essential to prevent liquid fuel from getting out and to manage significant changes in the pressure and volume of the gas during filling and throughout the time of storage in the tank.

Solutions have been developed for addressing these problems, and implement safety valves immersed in the tank and the upper part of which passes through a wall thereof. These valves generally open onto a duct leading to a casing or canister containing a material capable of trapping liquid vapours present in the gases coming from the reservoir. However, it is not unheard of for systems of this type still to exhibit difficulties because, owing to the particular circumstances of use, such as abrupt movements or excessive inclination of the vehicle, liquid from the tank can nonetheless get past the safety valve barrier and find itself in the duct leading to the canister, or may even reach this canister and disrupt the free passage of vapours.

To remedy this accidental entrainment of liquid out of the tank, attempts have been made at retaining the liquid escaping through the duct leading to the canister by introducing into this duct a dead volume intended to act as a capacity in which the liquid can collect and allow the vapour to pass freely.

Moreover, when it is not possible to incorporate them into the safety valve itself, safety devices preventing the tank from being overfilled (OPDs) and for automatically shutting it off in the event of roll-over ("ROV" or roll-over-valve device) have also to be mounted on the tank or in its nearby surroundings. Many pipes therefore connect the valve, the OPD and the ROV device and the canister together. These pipes of the numerous connections they entail are often the source of tiny leaks which are unacceptable given the EURO 2000 drastic emissions reduction programme and targets. Nor is it unheard of for these many pipes to have low points and siphons in which small amounts of liquid build up and form a corresponding number of obstacles to the free passage of the gases.

British Patent Application GB-A-2 269 375 discloses the use of a capacity with liquid-tight walls incorporated into a fuel tank, in which capacity a safety valve (see FIG. 2) is housed. A calibrated opening 14 raised at the top of the capacity allows liquid to enter when the reservoir is too steeply inclined or moves too violently. A non-return valve 12 of the duck-bill type allows the capacity 11 to be drained when the liquid level has dropped.

In this system, there however remain problems associated with inadvertent closure of the valve and with the increase in pressure in the tank which may disrupt the correct running of the engine. Furthermore, when small droplets of liquid are entrained through the orifice 14, they may, because of their low weight, be entrained directly by the gaseous stream to the vent pipe 7 without dropping into the capacity 11. The OPD and ROV have therefore also to be connected to the valve by pipes external to the tank.

Moreover, this known system does not protect the reservoir against the effect of excessive depression either, in this case keeping the reservoir closed and not allowing it to be vented.

The invention sets out to overcome the disadvantages of the known venting systems by providing a system which avoids placing a capacity on the pipes external to the tank, allows the liquid held in the capacity to be drained if the level of liquid in the tank drops, meets the tightest environmental standards and causes neither overpressure nor depression inside the tank.

To this end, the invention relates to a system for venting a liquid tank comprising, on the one hand, a closed volume internal to the tank and equipped with a draining device which acts as a capacity intended to collect and hold any entrainment of liquid from the tank and, on the other hand, a float valve arranged in the tank, situated outside the volume of the capacity and connected to the latter by means of a duct of the air vent circuit, in which the valve comprises means for:

a) venting the tank, including when the latter is inclined with respect to the initial position for which it was designed, b) preventing liquid from being ejected from the tank in the event that the latter becomes inclined or in the event that waves of liquid are produced within the tank, c) automatically shutting off the tank in the event that the latter rolls over ("ROV" or "roll-over-valve" function), d) regulating the useful volume of the tank and preventing the tank from being filled beyond a predetermined level ("OPD" or "overfill protection device" function), e) degassing the tank while it is being filled.

As a preference, the vent duct communicating with the valve constitutes one end of a venting circuit. The venting circuit may be a single one or, by contrast, there may be many examples of it present. Even more preferably still, this duct constitutes the end of the single venting circuit.

The liquid tank is a closed chamber, of various shapes, generally sealed with respect to the outside, which may be equipped with various internal accessories or accessories passing through the wall of the chamber. The tank may contain any type of organic or inorganic liquid, or mixture of such liquids. In particular, it is a fuel tank for motor vehicles. All types of fuel used in motor vehicles can be stored in the liquid tank such as, in particular, petrol and diesel oil, particularly diesel oil.

The system for venting a liquid tank which is the subject of the invention is a device comprising several elements the overall function of which is to allow a tank to be degassed while it is being filled and to allow it to be vented while it is in use and while the liquid it contains is being used up while protecting the external environment from any leak or emanation of undesirable gas.

According to the invention, the venting system comprises a closed volume internal to the tank. The expression "closed volume" is to be understood as meaning a volume of any shape whatsoever delimited by gas-tight and liquid-tight walls. This volume is located inside the tank and communicates with the valve by means of the vent duct, one end of which is connected to the valve. Its function is to constitute a capacity capable of collecting and retaining any entrainments of liquid from the tank which might have got past the valve barrier.

The volume of this capacity is chosen to be large enough to collect all liquid entrainments likely to get past the valve barrier under particular circumstances, particularly when the tank is full or near to its maximum fill level. This volume also depends on the dimensions and the actual design of the valve and on the diameter of the duct connecting it to it.

According to the invention, the closed volume internal to the tank acting as a capacity in the venting system comprises a draining device. The term "draining device" is to be understood as meaning a check valve, situated at a low point of the capacity, which can open when a sufficient weight of liquid has been collected in this capacity and which communicates directly with the interior volume of the tank. The function of this draining device is to recycle the liquid which has been entrained with the gases leaving the reservoir and prevent the capacity from becoming filled beyond a predetermined maximum level that depends upon the shape of this capacity and upon the characteristics of the check valve.

The venting system according to the invention also comprises a float valve, that is to say a device allowing the reservoir to be opened with the aid of a check valve controlled by the movement of a float carried along by the level of the liquid present in the tank.

According to the invention, the float valve is arranged inside the tank.

Alternatively, the float valve may also be arranged in the tank and have an upper part which passes through a wall of this tank. The penetration through the wall of the tank by the upper part of the valve is sealed by any appropriate technique which is well known per se. As an example of a sealing technique that can be used, mention may be made, non-limitingly, of the welding of the upper part of the valve to the cut wall of the tank, leakproof tight fitting or the use of a seal suited to the nature of the liquid contained.

The upper part of the valve emerging from the wall of the reservoir is, in the venting system according to the invention, in communication with a duct which constitutes one end of a venting circuit. In other words, the gases leaving the tank or entering it flow through this duct which is connected, in sealed manner, at one end, to the upper part of the valve opening onto the check valve actuated by the float and which, at the other end, communicates with a circuit leading to the external atmosphere.

According to the invention, the float valve is situated outside the volume of capacity. It may, with equal preference, be situated in close proximity to the capacity or, on the other hand, be situated in a region of the tank away from the latter. In each case, however, the float valve is connected to the capacity by means of the vent duct described above. As a preference, the valve is located in close proximity to the capacity A first important function of the valve according to the invention is to vent the tank when it is in place in the position for which it was designed or when it is inclined with respect to this position.

The term "inclined" is to be understood as meaning the condition that the tank is in when subjected to low-amplitude movements resulting from the use of the tank and of the liquid contained which are compatible with the absence of gravity flow of the liquid out of the tank via the valve.

In order to fulfil this function, the valve according to the invention will need to comprise means for allowing this venting. Any means allowing this function to be fulfilled under conditions favourable to user safety may be appropriate.

By way of an example of such means, mention may be made of a float valve in which the float is secured to a check valve communicating with the outside and the check valve of which remains open under normal conditions of use. The dimensions of the float and of the secured element carrying the check valve are designed to allow venting under normal conditions, that is to say when the reservoir is or is not inclined and when the liquid level prior to inclination does not exceed a certain threshold inside the reservoir and when the angle of any inclination there might be does not exceed a critical angle.

One means which has given good results is that of the float valve secured to a check valve which remains open when the valve is in the vertical or inclined position.

A second important function of the safety valve according to the invention is that of preventing the ejection of liquid from the tank when the latter is inclined as described above or when waves of liquid are produced therein. The term "prevent" is also to be understood, in the case of the valve according to the invention, as partial preventions and limitations on the free flow of liquid from the tank.

The liquid waves are hydrodynamic movements which rise at the surface of the liquid and may propagate through the mass in the tank when the latter is given movements in various directions as a result of its use.

The safety valve according to the invention comprises a means for preventing liquid from being ejected if the tank is too steeply inclined or if liquid waves of excessive amplitude are produced within it.

All effective means capable of blocking off the orifices through which liquid can pass to the outside in the event of an excessively steep inclination or of significant waves in the tank may be suitable.

One example of such means is the float valve secured to a shut-off check valve. The float slides in a barrel which may, as an alternative, extend under the valve and at the top of which there are apertures for the ingress of liquid into the valve. A spring pressed against the base of the float makes it possible, according to one particular embodiment, to compensate, in full or in part, for the friction forces of the float as it slides along the interior walls of the barrel.

A judicious choice of the size of the float, particularly of its height, of the shut-off check valve and of the strength of any spring there might be makes it possible to set precisely the angle of inclination beyond which a tank filled to its maximum level gives rise to closure of the valve and isolation of the contents of the tank. Likewise, a careful choice of the size of the height of the extension of the barrel under the valve makes it possible to influence the sensitivity of valve closure with respect to the energy of a given wave of liquid in the tank.

One means which has given good results is a float valve sliding in a barrel, secured to a check valve capable of shutting off the gas passage duct. The float furthermore rests on a dense ball which is housed in an inverted frustoconical well when the valve—tank assembly is in an uninclined position. When the inclination exceeds a certain angle, which depends on the mass of the ball, on the angle of the lateral walls of the well and on the weight of the float and forces of friction thereof in the barrel, the ball escapes from the well and may lift the float and cause the check valve to be closed.

Another important function of the valve according to the invention lies in its ability to close automatically as soon as the tank begins to roll over (a function known as a "roll-over valve" or ROV, for short). The expression "roll over" is understood as meaning a movement of sufficient amplitude that the liquid level in the tank can reach the valve under the effect of gravity alone. In particular, this expression also denotes any situation in which the valve finds itself immersed in the liquid of the tank. More specifically still, it denotes the situation in which the tank has rotated through 180° with respect to the initial position for which it was designed.

This closure occurs automatically, that is to say without further intervention external to the valve, be it human or as a result of a motor or any device whatsoever capable of supplying energy.

Another function fulfilled by the valve according to the invention is that of setting the useful volume of the tank and preventing the tank from being filled beyond a predetermined volume during the filling operation (making it also known as an "overfill protection device" or OPD for short).

The expression "useful volume" is to be understood as meaning the maximum permissible volume of liquid introduced into the tank that is compatible with safe use giving rise neither to overflowing nor to danger or contamination of the outside.

The safety valve according to the invention also comprises means for regulating the useful volume of the tank and for fulfilling the OPD function.

Any reliable means of fulfilling these functions using a single valve may be suitable.

As a preference, use is made of a valve which does not entail the presence or fitting of any pipework communicating with the tank filler nozzle. Such a valve comprises a float carrying a check valve which closes once the useful level of liquid in the tank is reached. The valve seat is sealed against liquids and gases and can withstand the overpressure which is set up in the tank when the check valve closes. This preferred valve is well suited to tanks which are filled by means of an automatic system which cuts off the inlet of liquid.

Another important function of the valve according to the invention is the possibility of degassing the tank, on which it is mounted, while the latter is being filled.

Any means capable of allowing this function may be used in the valve according to the invention.

It is possible, for example, to use a float valve bearing a shut-off element.

A float valve secured to a check valve which remains open when the liquid level in the tank does not carry the float beyond a certain level has given excellent results.

It is also advantageous, in one particularly preferred embodiment, to equip the valve with a barrel which extends far enough downwards under the seat of the float to avoid inadvertent closures of the valve when high flow rates of liquid are introduced into the tank and produce large-amplitude waves therein. Aside from its conventional action against the ejection of liquid from the tank when the latter is moving, such a barrel also plays a part in constantly venting the tank throughout the filling operation.

According to a particular form of the invention, the safety valve comprises a check valve fitted with a flexible seal.

The expression "check valve" is to be understood as meaning a closure device which makes it possible, at will, to cancel the exchange of matter between a chamber and its external environment.

The flexible seal with which the check valve is fitted comprises any deformable seal capable of being mounted on the check valve.

According to this embodiment of the valve according to the invention, the seal may be mounted on the valve head and collaborates with the moving part of the check valve. As a preference, this moving part is in the form of a needle which collaborates with the valve seat.

Alternatively, the seal may be mounted on the moving part of the check valve with a flat seat on the valve head.

Means for automatically closing the valve according to the invention in the event of the tank rolling over are also present. Any means capable of closing and isolating the tank in the event of rolling over will be appropriate.

An example of such a means is the one achieved using complex valves comprising a float carrying a shut-off check valve and weighted by means of a dense body secured to them, for example hollow floats containing a dense body inside their wall and a spring counterbalancing most of the weight of the dense body when the valve is in the vertical position of rest. When the tank and the valve roll over, the weight of the dense body combines with the thrust of the spring to push the float thus submerged towards the valve seat.

A means comprising a valve equipped with a float, under which is arranged a cage with a perforated well in which there rests a dense ball which, when moved under the effect of gravity, pushes the valve float upwards towards the valve seat in the event of the valve rolling over, has given excellent results.

Another function which may be incorporated into the safety valve according to the invention is that of affording safety venting of the tank under situations of excessive depression or excessive overpressure by comparison with the pressure outside.

What happens is that in certain situations, a depression may develop inside the tank for example when it is left closed and the temperature drops appreciably, thus causing the liquid and, to a greater extent the gas, present in the closed tank to contract. Another depression situation is the one in which the tank is closed and there is a rapid and continuous consumption of liquid. Excessive depression within the tank could lead to certain dangers and has to be avoided by implementing means for venting the tank beyond a certain threshold depression.

In other situations, for example when the tank is stored full, with the valve closed, in an atmosphere in which the temperature increases rapidly in a significant manner, a dangerous overpressure may develop inside the tank.

Any means capable of arming the tank against such excessive depressions or overpressures may be used in the valve according to the invention.

For example, it is possible to use a system allowing air to be introduced through a secondary passage orifice.

The opening of this secondary passage orifice may be controlled by means of an additional seal separate from the one which seals the check valve or, alternatively, as a variant, using a lightweight ball arranged in a well a short distance beneath an outlet orifice and thus acting as a nonreturn device for the air entering the tank.

This depression safety feature may also be incorporated into the flexible seal that seals the check valve. As a preference, use is not made of a secondary passage orifice distinct from the main vent orifice, but rather of a check valve system that can be supplied with a small flow of air from the upper part of the valve head. This check valve opens only under the influence of an internal set pressure corresponding to the maximum pressure compatible with safe use of the tank.

As a preference, the check valve is fitted with at least one flexible seal which deforms to trigger the opening of a passage to the outside of the tank when a certain pressure or depression threshold is reached.

As a preference, the flexible seal is of annular shape and has deformable lips which seal the tank closed, thus making it safe in the event of a depression and overpressure. These lips are of a thickness which is tailored so that they can deform under the influence of a given pressure difference exerted on their opposite faces. For each seal, there is an overpressure or depression threshold for which the lips deform sufficiently to open a passage in the valve seat and thus place the inside of the tank in communication with the outside.

According to the invention, the flexible seal is capable of deforming and of opening under depression and overpressure situations with respect to the outside pressure. Different seals may provide safety for overpressure and safety for depression.

As a preference, the same seal provides safety for depression and for overpressure. In this case, it may comprise lips which deform under the influence of the depression which are separate from other lips which also form part of the same seal and which deform in the event of an overpressure.

As a particular preference, the flexible seal that affords safety for depression and overpressure is the same as the flexible seal which seals the check valve part of the valve.

One particularly preferred embodiment is the one in which the flexible seal has lips which provide safety for depression which are separate from those which provide safety for overpressure.

According to an advantageous form of embodiment of the venting system, the device for draining the capacity consists of a flexible diaphragm which closes an orifice situated in a low point of the capacity.

A diaphragm made of elastomer in the form of an inverted umbrella has given excellent results.

Another subject of the present invention is the use of the venting system described above for venting a fuel tank in a motor vehicle.

The use of this system is particularly suited to the venting of a tank in which the fuel is diesel oil intended to supply a diesel engine.

The FIGURE which follows is intended to illustrate the invention without in any way restricting its scope.

It depicts a sectional view of a venting system of a diesel fuel tank 6, mounted on a vehicle, comprising a valve 1 and a capacity 2 arranged nearby. A duct 4 connects the upper part of the valve 1 to that of the capacity 2. A gas outlet duct 10 is connected to a canister (not illustrated). The lower part 12 of the capacity 2 is pierced with orifices 13 shut off by a deformable diaphragm 14 in the shape of an inverted umbrella, which acts as a non-return valve.

The valve 1 essentially comprises four distinct parts: a barrel 5 of cylindrical shape, immersed in a tank, in which a moving part 7 slides. The barrel 5 is surmounted by a head 9 which extends beyond the wall 16 of the tank 6. The head 9 and a wall 11 define a closed space in the form of a pipe 4.

The moving part 7 is made up of a float 3 surmounted by a needle 17 which is secured to it and which can shut off an orifice 15 situated at the centre of the head 9.

The float 3 rests on a ball 18 made of a dense substance which is free to move in a well 19 situated in a central position in a bottom 20 secured to the walls of the barrel 5. The base of the well 19 is pierced with an opening 21 which allows liquid from the tank to pass. Other apertures (not depicted) are also pierced in the walls of the well 19 and the bottom 20.

The barrel 5 is extended under the opening 21 by a skirt 22, the purpose of which is to restrict the sensitivity of the valve to waves of liquid which may run through the tank during venting.

Apertures 23 are pierced in the upper part of the barrel 5 and serve to remove gas from the tank.

An annular seal 24 with deformable lips 25 arranged on the periphery of the orifice 15 collaborates with the needle 17 carried by the float 3 to form a check valve which regulates the opening and closing of the valve.

The way in which the vent system depicted in the figure works is as follows.

When the liquid present in the tank is being used and its level in the tank is significantly below its maximum permissible safe level, it does not reach the base of the float 3. If the reservoir becomes inclined, the valve follows the movement and becomes inclined by the same angle as the tank with respect to its initial position. If the angle of inclination of the tank is increased, then as long as the weight of the dense ball 18, increased by the weight of the float 3—needle 17 pairing and the friction forces maintains a component tangential to the wall of the well 19 situated on the same side as the inclination which is lower than its vertical component, the ball 18 will remain housed in the bottom of the well 19 and the needle 17 carried by the float 3 will maintain a passage between its upper part and the valve seat delimited by the seal 24. As soon as the value of the tangential component slightly exceeds that of the vertical component as a result of an increase in the angle of inclination of the tank, the ball 18 will begin to move along the wall of the well situated on the same side as the inclination, and will cause the float to lift and the needle 17 to move closer to the seal 24. Throughout the period for which the check valve remains open, the tank will be able to be vented. The situation will change when the angle of inclination is large enough to cause the moving needle 17 to come into contact with the seal 24. At that moment, the valve closes and tank venting stops, thereby preventing liquid from being ejected from the inclined tank.

If waves are produced inside the tank, then when their energy is great enough to lift the float 3, bearing in mind, however, the damping effect created by the skirt 22, the valve closes and also prevents liquid from being ejected from the tank.

If the tank is rolled over, the dense ball 18 will come to rest with all its weight on the float 3 and rapidly close the passage to liquid by virtue of contact between the needle 17 and the seal 24.

During the tank-filling operation, when the maximum permissible safe volume of liquid is reached, the float 3, carried along by the liquid, rises up and shuts off the check valve by virtue of contact between the needle 17 and the seal 24. The maximum permissible volume can be set by choosing the height of the float 3 and of the needle 17 and by adjusting the flotation line of the float 3.

If attempts are made at filling the tank with liquid beyond the maximum permissible level, the pressure increases inside the tank and the liquid begins to rise up inside the filler nozzle, from where it will not take long to act on the device that automatically shuts off this same filling system.

Throughout the filling period during which the float 3 remains in its lowermost position and while the float begins to rise up inside the barrel 5 but has not yet reached a sufficient level for the needle 17 to come into contact with the seal 24, the tank may continue to be degassed.

When the full tank is left in the valve-closed position and the pressure begins to increase sharply inside for any reason, for example in the case of a significant rise in the temperature, the lips 25 of the seal 24 in contact with the needle 17 may open and allow safety venting intended to cause the internal pressure to drop below a value compatible with safe tank behaviour.

Likewise, in the opposite scenario in which an excessive depression arises in the tank, the lips 25 of the seal 24 open and allow external air in so as to make the use of the tank safe.

When the vehicle is in motion or when the tank is being filled, with the vehicle stationary, the gases from inside the tank 6 enter the valve 1 via the orifices 23 situated at the upper part of the barrel 5, from where they escape via the duct 4 and the capacity 2 to the end of the duct 10 leading to the canister. If, for example as a result of violent movements of t he diesel oil in the tank during filling or movement of the vehicle with its tank filled to a high level close to the maximum permissible level, diesel oil were entrained with the gases into the nozzle 4, it would drop to the bottom of the capacity 2 and remain held therein while the gases continued their path towards the outlet 10 and the canister. As soon as the vehicle is stationary and no pressure difference induced by the flow of gases escaping from the tank remains, the diesel oil trapped in the capacity 2 passes through the orifice 13, opens the diaphragm 14 under the influence of its own weight, and returns to the tank 6. The diaphragm 13 is chosen so that it deforms and opens under the weight in the capacity 2, of a given height of petrol lower than the total height of the volume available inside the capacity.

The venting system according to the figure makes it possible to fulfil an advantageous additional function, namely venting the tank in situations in which its internal atmosphere is at a depression while the valve 1 is closed. This situation may become dangerous when there is simultaneous consumption and continuous withdrawal of a substantial amount of fuel and may, in certain cases, cause the walls of the tank to implode. This may occur while the tank is filled to a level close to its maximum level and the vehicle is climbing a steep slope, causing closure of the valve 1 through movement of the float 3. In this situation, the diaphragm 14 opens under the influence of the pressure difference across its walls due to the depression set up in the tank and thus allows air in via the capacity 2 connected to the duct 10 leading to the canister and to the external atmosphere.

What is claimed is:

1. A system for venting a liquid tank comprising, on the one hand, a closed volume internal to the tank and equipped with a draining device which acts as a capacity intended to collect and hold any entrainment of liquid from the tank and, on the other hand, a float valve arranged in the tank, situated outside the volume of the capacity and connected to the latter by means of a duct of an air vent circuit, wherein the valve comprises means for:
    a) venting the tank, including when the latter is inclined with respect to the initial position for which it was designed,
    b) preventing liquid from being ejected from the tank in the event that the latter becomes inclined or in the event that waves of liquid are produced within the tank,
    c) automatically shutting off the tank in the event that the latter rolls over, thereby realizing an ROV function,
    d) regulating a useful volume of the tank and preventing the tank from being filled beyond a predetermined level,
    e) degassing the tank while it is being filled.

2. Venting system according to claim 1, wherein the valve also comprises a check valve equipped with at least one flexible seal.

3. Venting system according to claim 2, wherein the flexible seal of the check valve part of the valve is mounted on a head of the valve and collaborates with a moving part of the check valve.

4. Venting system according to claim 1, wherein the ROV function is achieved by means of a cage with a perforated well situated under the float valve, in which well there rests a dense ball which, when it moves under the effect of gravity, pushes the float of the float valve upwards and closes a needle-type valve, a moving part of which is secured to this float and capable of blocking off a valve outlet duct.

5. Venting system according to claim 3, wherein the seal has an annular shape and deformable lips which make the tank safe in the event of depression and in the event of overpressure.

6. Venting system according to claim 5, wherein, in the annular seal, different lips provide safety for depression and safety for overpressure.

7. Venting system according to claim 1, wherein the draining device consists of a flexible diaphragm closing an orifice situated at a low point of the capacity.

8. Venting system according to claim 7, wherein the diaphragm is made of an elastomer in the form of an inverted umbrella.

9. Process for venting a fuel tank in a motor vehicle, wherein the tank is equipped with the venting system according to claim 1.

10. Process according to claim 9, wherein the fuel is diesel oil intended to supply a diesel engine.

* * * * *